R. POMERENKE.
CLAMP AND DOG COMBINATION.
APPLICATION FILED JULY 14, 1920.
1,370,994. Patented Mar. 8, 1921.
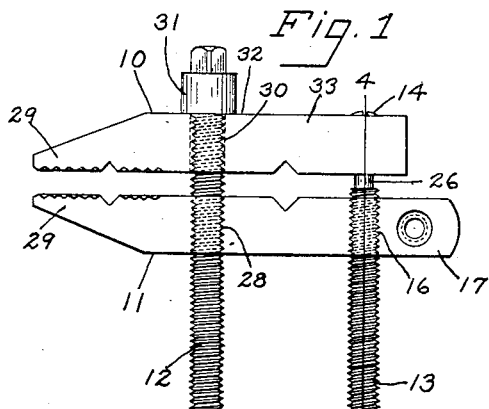
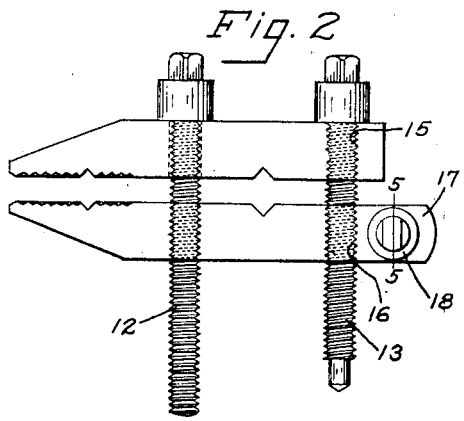
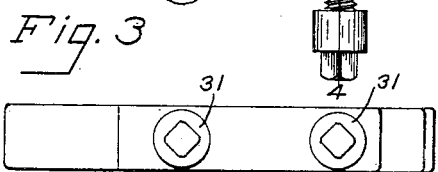
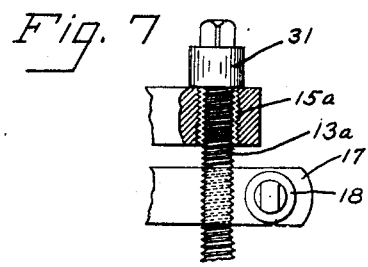
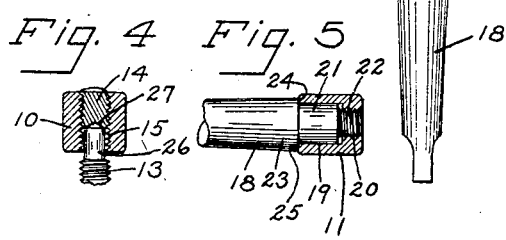
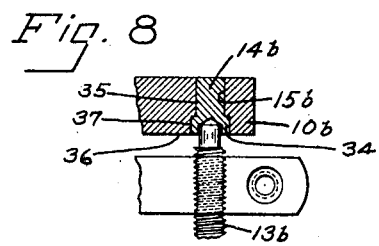
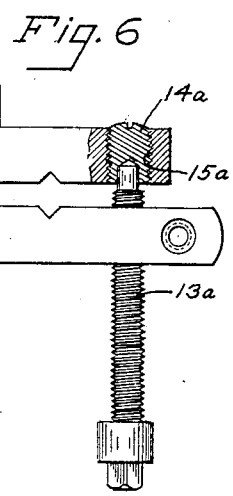
Inventor
Rudolph Pomerenke
By Louis M. Schmidt
Atty.

UNITED STATES PATENT OFFICE.

RUDOLPH POMERENKE, OF NEW BRITAIN, CONNECTICUT.

CLAMP AND DOG COMBINATION.

1,370,994.  Specification of Letters Patent.  Patented Mar. 8, 1921.

Application filed July 14, 1920. Serial No. 396,121.

*To all whom it may concern:*

Be it known that I, RUDOLPH POMERENKE, a citizen of Russian Poland, residing at New Britain, in the county of Hartford and State of Connecticut, have invented certain new and useful Improvements in Clamp and Dog Combinations, of which the following is a specification.

My invention relates to improvements in clamp and dog combinations, and the object of my improvement is to produce a device for the use of machinists and mechanics that is adapted by a relatively slight changing and rearrangement of the parts for use either as a clamp for holding together pieces of work that are to be operated upon or holding work generally, or as a dog for holding work in a lathe or other machine tool.

In the accompanying drawing:—

Figure 1 is a side elevation of my improved clamp and dog combination, showing the parts arranged for use as a clamp.

Fig. 2 is a similar view, with the parts arranged for use as a dog.

Fig. 3 is a plan view, showing the parts arranged for use as a dog, as shown in Fig. 2.

Fig. 4 is a fragmentary sectional view on the line 4—4 of Fig. 1, showing the removable backing-up screw or plug device that is used in one of the body parts for receiving the end of one of the clamping screws, as shown in Fig. 1.

Fig. 5 is a fragmentary sectional view on the line 5—5 of Fig. 2, showing the joint between the removable arm and one of the body parts.

Fig. 6 is a view of a modified form of structure with the parts arranged for use as a clamp, being generally in side elevation, the screw plug device being in section, the screw threaded hole for the said plug device being of larger diameter than that shown in Fig. 4, so as to provide for free movement therein for the screw that may be extended therethrough, without obstruction of such movement by the screw threads on the side wall of the hole.

Fig. 7 is a fragmentary side elevation of the structure shown in Fig. 6 with the screw plug device removed and the parts arranged for use as a dog.

Fig. 8 is a side elevation of another modification, with the parts arranged for use as a clamp, showing a plug device in the form of a headed plug that is inserted in the opening in the body part from the inner side, the said plug device and adjacent parts being shown in section.

Fig. 9 is a plan view of the headed sleeve plug device shown in Fig. 8.

My improved clamp and dog combination comprises a pair of jaw members, consisting of the upper jaw member 10 and the lower jaw member 11, a pair of clamping screws, consisting of the inner screw 12 and the outer screw 13, and a plug device 14, which in the form shown in Fig. 4 consists of a screw plug.

The plug device 14 is used to back up the end of the outer screw 13 when the parts are arranged for use as a clamp, being positioned in the screw threaded hole 15 at the outer end portion of the upper jaw member 10, the said screw 13 having screw threaded engagement with the threaded hole 16 in the outer end portion of the lower jaw member 11.

The said outer end portion of the lower jaw member 11 is provided with an outward extension 17 on which is mounted an arm 18 that projects laterally from the general plane of the jaw members 10 and 11 and the screws 12 and 13 that coöperate therewith and that is used in the usual manner when the parts are arranged for use as a dog. As shown, the said arm 18 is removably connected to the jaw member 11, the construction of the joint being shown in Fig. 5. The jaw member 11 has a socket opening that comprises a cylindrical portion 19 that constitutes the main part on the receiving or entrance side and is extended through the remaining thickness of the arm 11 in the form of a screw threaded perforation 20 that is appreciably smaller in diameter than the said main part 19, and the arm 18 has a connecting end portion that is the counter part of the socket described, comprising a cylindrical part 21 that terminates in the form of a reduced, threaded part 22. At the junction of the cylindrical part 21 and the body portion 23 of the arm 18 there is a shoulder 24 that is adapted to be seated against the opposed face 25 of the jaw member 11.

The two threaded holes 15 and 16 are of the same size and fit the outer screw 13 and the changes involved in the parts between use as a clamp and a dog comprise manipulating the said outer screw 13 and the screw plug 14.

When used as a clamp, as shown in Fig. 1, the screw 13 is entered into the hole 16 from the lower side and screwed through the lower jaw member 11, and the tip end 26 of the screw is entered into the hole 15 and abuts against the screw plug 14, which is inserted therein from the upper side and only partially fills the said hole 15. The said tip end 26 of the screw 13 is reduced so as to avoid contacting with the threads of the hole 15 and thus permits of freely turning the screw 13 in abutment with the screw plug 14.

In order to positively position the tip end 26 in the hole 15 so as to avoid damaging the threads of the hole 15 I provide a tapered or conical form for the opposed contacting surfaces of the screw 13 and the screw plug 14, as shown at 27.

Except for the provision of the extension 17 for supporting the lateral arm 18 on the lower jaw member 11 the said jaw member 11 is like other jaw members in common use for clamps of the general form shown, comprising on the inner side of the hole 16 and in spaced relation thereto a second threaded hole 28 for the inner screw 12, and also having on the end remote from the extension 17 an outside jaw 29 for engaging with work outside of the space between the screws 13 and 12.

The mating upper jaw member 10 is adapted for coöperating with the jaw member 11 for clamping work and has an outside or overhanging jaw 29 for mating with the jaw 29 on the lower jaw member 11, and also has a hole 30 of the usual form for the inner screw 12 that is of sufficiently large diameter to permit the said inner screw 12 to turn freely therein without obstruction.

The head 31 of the inner clamping screw 12 operates in abutment with the outside face 32 of the upper jaw member 10.

In the use as a clamp the work is held between the two overhanging jaws 29, and, as has been described, the plug screw 14 is used in coöperation with the outer clamping screw 13.

In the use as a dog the work is clamped between the body portions 33 of the jaw members 10 and 11, being positioned in the space between the two clamping screws 12 and 13, and the parts are set for effecting the clamping as follows:—The screw plug 14 is removed from the hole 15; the screw 13 is removed from the hole 16 and is reversed and entered into the hole 15 from the upper side; the work is placed in position in the space bounded by the jaw members and the clamping screws, and the jaws are positioned in engagement with the work, the jaw members being set to approximately the clamping position; the outer clamping screw 13 is then screwed through the hole 15 and into the threaded hole 16 in the lower jaw member 11, and then the clamping is effected by screwing the inner screw 12 to the clamping position.

In the case of the construction described above, in order to make an appreciable change in the setting of the jaw members for use as a dog with work of corresponding differences in size it is necessary to remove entirely the outer screw 13 from the jaw members 10 and 11 and replace the screw again after the proper setting has been obtained for the jaw members, involving a relatively slow and tedious manipulation of the said screw 13 in unscrewing and screwing the same.

This tedious manipulation may be avoided in different ways, two of which ways are shown and will be described below.

In the form shown in Fig. 6 the hole 15$^a$ differs from the hole 15 in being of larger diameter, being of sufficient diameter to permit of free movement therein of the screw 13$^a$ without being obstructed by the screw threads in the side wall.

In the form shown in Fig. 8 the hole 13$^b$ is also of sufficient size to permit of free movement therein of the screw 13$^b$ that coöperates therewith, and differs from the hole 13$^a$ in that it is of cylindrical form, without any screw threads.

In both of these modified forms the outer screw, 13$^a$ in Fig. 6 and 13$^b$ in Fig. 8, operates like the inner screw 12 and after the manner of the screws in dogs such as are in common use.

In the structure shown in Fig. 6 the plug device 14$^a$ is in the form of a plug screw that differs from the plug screw 14 only in the detail of the size.

In the structure shown in Fig. 8 the plug device 14$^b$ is in the form of a headed device that is inserted in the hole 15$^b$ from the inside face of the jaw member 10$^b$ and in lieu of the screw threads on the exterior is held in place when in use by the engagement of the head 34 with the said inside face. Thus the said plug device 14$^b$ comprises a body portion 35 of cylindrical form that fits and fills the hole 15$^b$ generally and the head 34 on the inside end.

Actually, instead of having the head 34 bear directly against the said inside face 36 of the jaw member 10 I provide a recess 37 that extends inwardly from the said inside face 36 that is adapted to receive the head 34 so as to produce a flush structure and avoid the projection of the head into the space between the opposed faces of the jaw members 10 and 11.

I claim as my invention:—

1. A clamp and dog combination comprising a pair of jaw members for being positioned in opposition one to the other so as to engage with work positioned therebetween and having each a pair of holes in spaced relation, the holes in one mating with the holes in the other, a pair of clamping screws for effecting clamping of the said work operative to coöperate with the said jaw members through the medium of the said holes, a plug device for closing one of the holes in one of the jaw members for receiving the tip end portion of the clamping screw that is operatively engaged with the side wall of the opposed hole in the other jaw member, and the peripheral portion of the said plug device and the opposed wall portion of the hole in the jaw member being provided with interengaging parts for operatively holding the plug device in position.

2. A clamp and dog combination as described in claim 1, the said tip end portion of the clamping screw and the opposed face portion of the plug device being formed and shaped so as to operate to position the clamping screw relatively to the jaw member.

3. In a clamp and dog combination as described in claim 1, the said plug device having a head for engaging with the border wall of the hole in the jaw member for limiting the position of the said plug member relatively to the jaw member.

RUDOLPH POMERENKE.